United States Patent [19]
Fixemer

[11] Patent Number: 5,813,472
[45] Date of Patent: Sep. 29, 1998

[54] GUIDANCE SYSTEM FOR AN AGRICULTURAL IMPLEMENT

[76] Inventor: Richard A. Fixemer, 607 E. Hickory, Sutton, Nebr. 68979

[21] Appl. No.: 851,198

[22] Filed: May 5, 1997

[51] Int. Cl.⁶ .................................................. A01B 63/00
[52] U.S. Cl. ................................................ 172/26; 172/6
[58] Field of Search .............................. 111/52, 164, 135, 111/136, 924, 927; 172/26, 311, 6, 283, 278, 282, 569, 576, 590

[56] References Cited

U.S. PATENT DOCUMENTS

| | | | |
|---|---|---|---|
| 759,489 | 5/1904 | Weeks . | |
| 1,268,085 | 6/1918 | Bimson . | |
| 1,900,525 | 3/1933 | Silver . | |
| 2,772,617 | 12/1956 | Tangeman | 97/47.65 |
| 4,228,860 | 10/1980 | Orthman | 172/26 |
| 4,282,934 | 8/1981 | Bezzerides | 172/26 |
| 4,367,621 | 1/1983 | Swetnam et al. | 56/10.2 |
| 4,463,811 | 8/1984 | Winter | 172/26 |
| 4,520,876 | 6/1985 | Peterson et al. | 172/427 |
| 4,616,712 | 10/1986 | Jorgensen | 172/6 |
| 4,640,365 | 2/1987 | Schmidt | 172/26 |
| 4,702,323 | 10/1987 | Smit et al. | 172/26 X |
| 4,883,126 | 11/1989 | Leland | 172/26 |
| 4,930,581 | 6/1990 | Fleischer et al. | 172/6 |
| 4,974,683 | 12/1990 | Hanig et al. | 172/156 |
| 5,031,704 | 7/1991 | Fleischer et al. | 172/6 |
| 5,392,863 | 2/1995 | Fixemer | 172/6 |
| 5,476,147 | 12/1995 | Fixemer | 172/26 |

OTHER PUBLICATIONS

"Buffalo Hip Huggers", Brochure (no date).
"Buffalo Scout", Brochure (no date).
"The Guide Sideshifter Quick Hitch", Brochure, Lincoln Creek Mfg. (no date).
"The Guide Quick Hitch", Brochure, Lincoln Creek Mfg. Co., Inc. (no date).
"Orthman MP II Tracker Automatic Guidance System", Brochure, Identified by BAC 9093/8/89, Orthman Mfg., Inc. Aug. 1989.
"Orthman Computerized Quick Hitch CQH Swinger", Brochure, Identified by BAC 11174/6/91, Orthman Mfg., Inc. (Jun. 1991).
"Orthman Computerized Steering Control CSC Tractor Guidance," Brochure, Identified as BAC 11172/6/91, Orthman Mfg., Inc. (no date).
"Ridge Till Farmers Tell How: Raised Beds Lower Costs," article in Apr. issue of Soybean Digest Sep. 1989.
"Acura Trak Guidance Control. The Pioneer in Quick Hitch Row Crop Guidance", Brochure, SUNCO (no date).

*Primary Examiner*—Michael J. Carone
*Assistant Examiner*—Robert Pezzuto
*Attorney, Agent, or Firm*—Zarley,McKee,Thomte Voorhees & Sease; Dennis L. Thomte

[57] ABSTRACT

A guidance system for an implement drawn by a tractor with the implement being interconnected to the tractor by a conventional hitch. An elongated arm or support is pivotally secured, about a vertical axis, to the implement adjacent one end thereof and extends forwardly therefrom. A pair of gauge wheels are rotatably mounted on the forward end of the arm and are adapted to follow along the opposite sides of a ridge of the row. A ground engaging coulter is supported on the elongated arm and as the elongated arm pivots with respect to the implement, as the implement moves out of proper alignment with the rows, the coulter tends to steer the implement back into proper alignment with the rows and provides further resistance to the lateral movement of the gauge wheels with respect to the ridge.

9 Claims, 4 Drawing Sheets

GUIDANCE SYSTEM FOR AN AGRICULTURAL IMPLEMENT

BACKGROUND OF THE INVENTION

1. Field of the Invention

This invention relates to a guidance system for an agricultural implement and more particularly to a means for mounting a guidance system forwardly of the implement adjacent one end thereof.

2. Description of the Prior Art

In many farming operations, agricultural implements such as cultivators, planters, fertilizer spreaders, and sprayers are pulled by tractors and are used in connection with row crops. It is extremely important that the implement be properly positioned with respect to the row so that the implement does not damage the crop. In ridge till operations, it is extremely important that the planter be centered with respect to the ridge so that the seeds are properly positioned in the ridges. It is also important that the fertilizer applicators and sprayers also be properly positioned with respect to the growing crop in the ridge. In cultivating operations, it is very important that the cultivator be properly positioned with respect to the rows to prevent damage to the growing crop.

Many types of guidance devices have been previously provided for use with an agricultural implement so that the implement will be moved laterally with respect to the tractor should the implement be out of alignment with the rows being planted, cultivated, etc. One type of guidance control apparatus is disclosed in U.S. Pat. No. 4,930,581 issued Jun. 5, 1990, to Fleischer, et al. In the device of the '581 patent, the position of the implement is sensed by a pair of sensing wands which engage the emerging crops of adjacent rows. Should the implement move laterally with respect to the row for one reason or another, the wand resolver, which is operatively connected to the sensing wands, will generate an electrical signal to actuate a hydraulic circuit so that the hitch connecting the implement and the tractor will pivot about a vertical axis to laterally shift the implement.

A guidance system which is believed to be very similar, if not identical, to the device disclosed in U.S. Pat. No. 4,930,581 is manufactured by Fleischer Manufacturing, Inc., Columbus, Nebr., under the trademark BUFFALO SCOUT.

Another type of guidance system is manufactured by Lincoln Creek Manufacturing Co., Inc. of Phillips, Nebr., under the trademark THE GUIDE. It is believed that the guidance system manufactured by Lincoln Creek Manufacturing Co., Inc. laterally shifts the hitch which connects the implement and the tractor when the implement is sensed to be out of alignment with the row.

Yet another type of guidance control is manufactured by Sunco Marketing of North Platte, Nebr., under the trademark ACURA TRAK. Other types of guidance systems are manufactured by Orthman Manufacturing Co., Inc. of Lexington, Nebr., under the trademarks CQH SWINGER and MP III TRACKER.

In the prior art guidance systems described hereinabove, the systems include guide rods, guide weights, sensing wands, or the like which are normally located at the center of the implement and are normally positioned behind the draw bar of the implement and dragged through the field. It is believed that the prior art guidance systems suffer from certain disadvantages in that the guide weights, wands, rods, etc., are not able to accurately sense the position of the implement due to the condition of the field which may have clods, rocks, crop residue, etc., in the rows which adversely affects the sensing operation. Further, by positioning the sensing means behind the draw bar, it is believed that the sensing means suffers from a slight delay in sensing the position of the implement since the front portion of the implement will have already passed over that which is being sensed.

In an effort to improve upon the prior art devices, applicant previously devised two separate guidance systems which are described in U.S. Pat. Nos. 5,392,863 and 5,476,147. The devices of applicant's prior patents have met with success, although it has been found that in some cases it is not necessary to use the elaborate electrical sensing means disclosed in the above-identified patents and it is not necessary to provide the pivotal interconnection means shown in FIGS. 11, 12 and 13 of the '147 patent.

SUMMARY OF THE INVENTION

Figure 1:
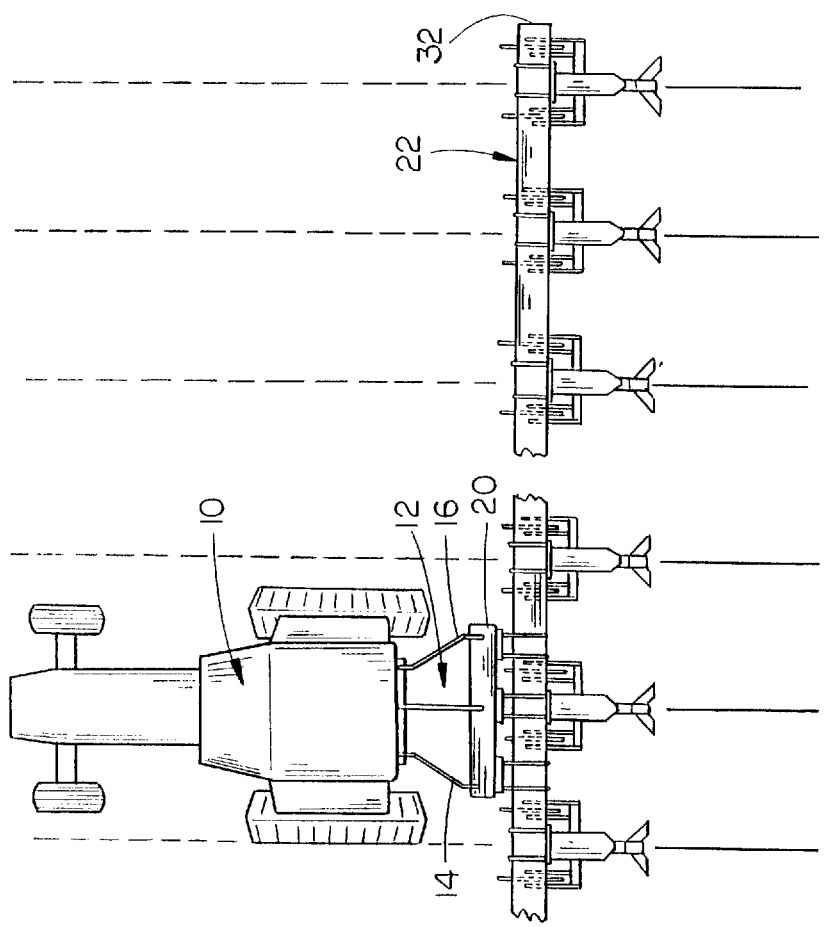
FIG. 1 is a partial top view illustrating the guidance system of this invention mounted at one end of a tool bar.
Figure 1:
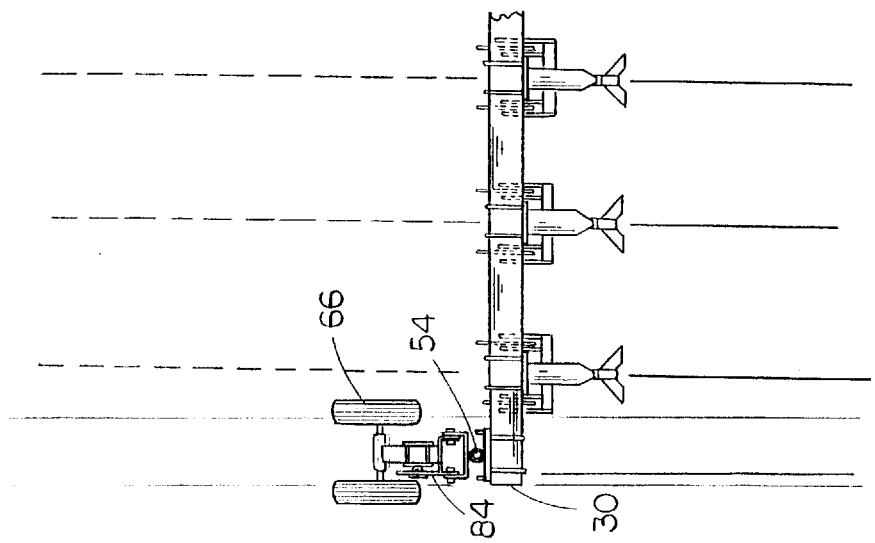

A guidance system is disclosed which is adapted for use with an implement being drawn by a tractor with the implement being connected to the tractor by a hitch means. In the instant invention, a support means in the form of an elongated arm is pivotally secured, about a horizontal axis, to the tool bar. A ground engaging means in the form of a pair of wheels is rotatably mounted at the forward end of the support means for following a row or a ridge in the field. A ground engaging coulter is secured to the support rearwardly of the ground engaging means and is rotatable about a horizontal axis. The coulter is laterally offset with respect to the vertical axis between the elongated arm and the tool bar. The coulter is selectively vertically adjustable with respect to the support means.

It is therefore a principal object of the invention to provide an improved guidance system for an implement.

Yet another object of the invention is to provide a guidance system which may be easily mounted on conventional implements such as planters, fertilizer applicators, cultivators, sprayers, etc., without extensive modification of the implement.

Yet another object of the invention is to provide a guidance system of the type described which includes ground engaging coulter means which enhances the ability of the ground engaging means to follow a row or ridge.

Yet another object of the invention is to provide a guidance system of the type described which is economical of manufacture, durable in use and refined in appearance.

These and other objects will be apparent to those skilled in the art.

DESCRIPTION OF THE PREFERRED EMBODIMENT

In the drawings, the numeral 10 refers to a conventional tractor having a conventional hitch 12 positioned at the rearward end thereof. Hitch 12 includes lower links 14 and 16 and upper link 18. The lower links 14 and 16 are normally prevented from lateral movement by conventional sway bars or the like.

The numeral 20 refers to a conventional prior art hitch which interconnects the hitch of the tractor to the tool bar 22 of the implement 24. For purposes of description, tool bar 22 will be described as having a forward side 26, rearward side 28, and opposite ends 30 and 32.

The guidance system of this invention is referred to generally by the reference numeral 34. Guidance system 34 includes a vertically disposed plate 36 which is bolted to tool bar 22 by a pair of U-bolts 38 and 40 so that plate 36 is positioned adjacent the forward side 26 of tool bar 22. A pair of stops 42 and 44 are provided on the forward side of plate 36 for a purpose to be described hereinafter. The numerals 46 and 48 refer to a pair of collars or sleeves which are secured to plate 36 in a vertically spaced-apart manner. Collar or sleeve 50 is secured to plate 52 and is adapted to be rotatably received between collars 46 and 48. Pin 54 extends through collars 48, 50 and 46 to provide a pivotal connection between plates 36 and 52. A C-shaped support member 56 is welded to the forward side of plate 52 and has a C-shaped support 58 selectively horizontally adjustably mounted thereon by means of bolts 60.

Figure 5:
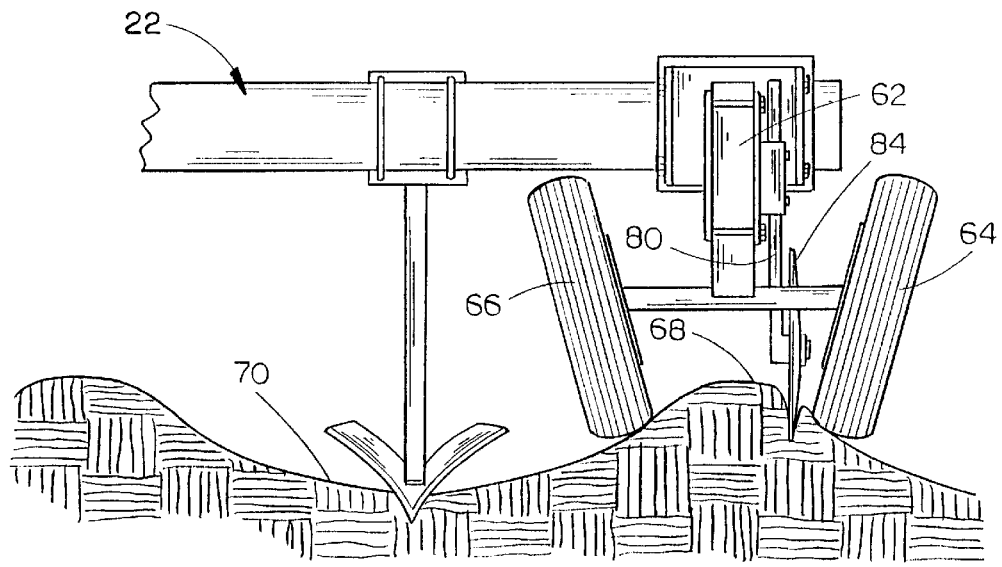
FIG. 5 is a front view of the guidance system of this invention.

System 34 also includes an elongated arm 62 which is welded to the forward side of support 58 and which extends downwardly and forwardly therefrom, as illustrated in the drawings. A ground engaging means in the form of a pair of wheels 64 and 66 are rotatably mounted at the forward end of arm 62 and are cambered inwardly, as best seen in FIG. 5. Wheels 64 and 66 are adapted to follow a ridge or a row in the field. FIG. 5 illustrates the wheels 64 and 66 following a ridge located at one side of a furrow 70.

Figure 2:
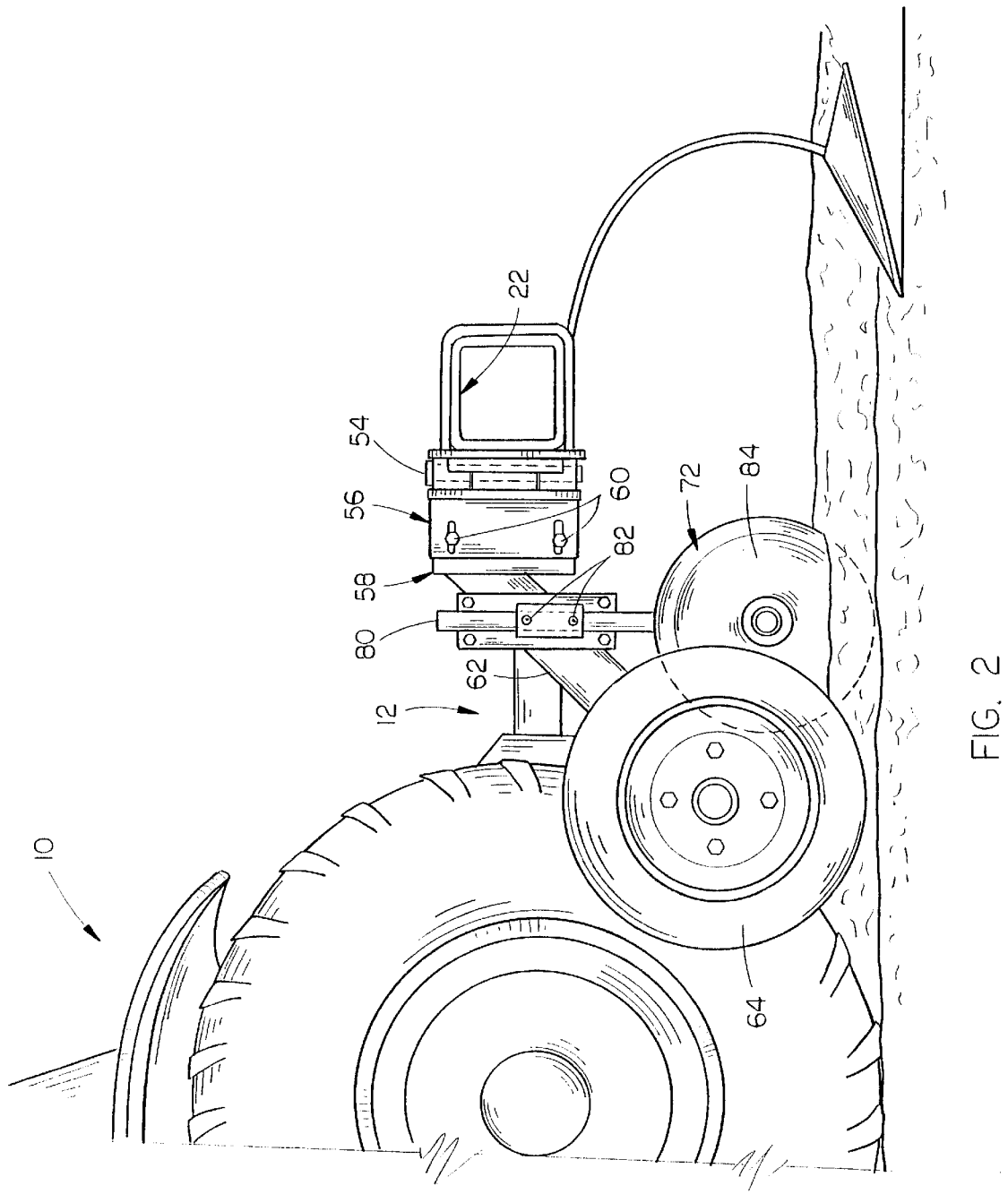
FIG. 2 is a side elevational view of the guidance system of this invention.
Figure 3:
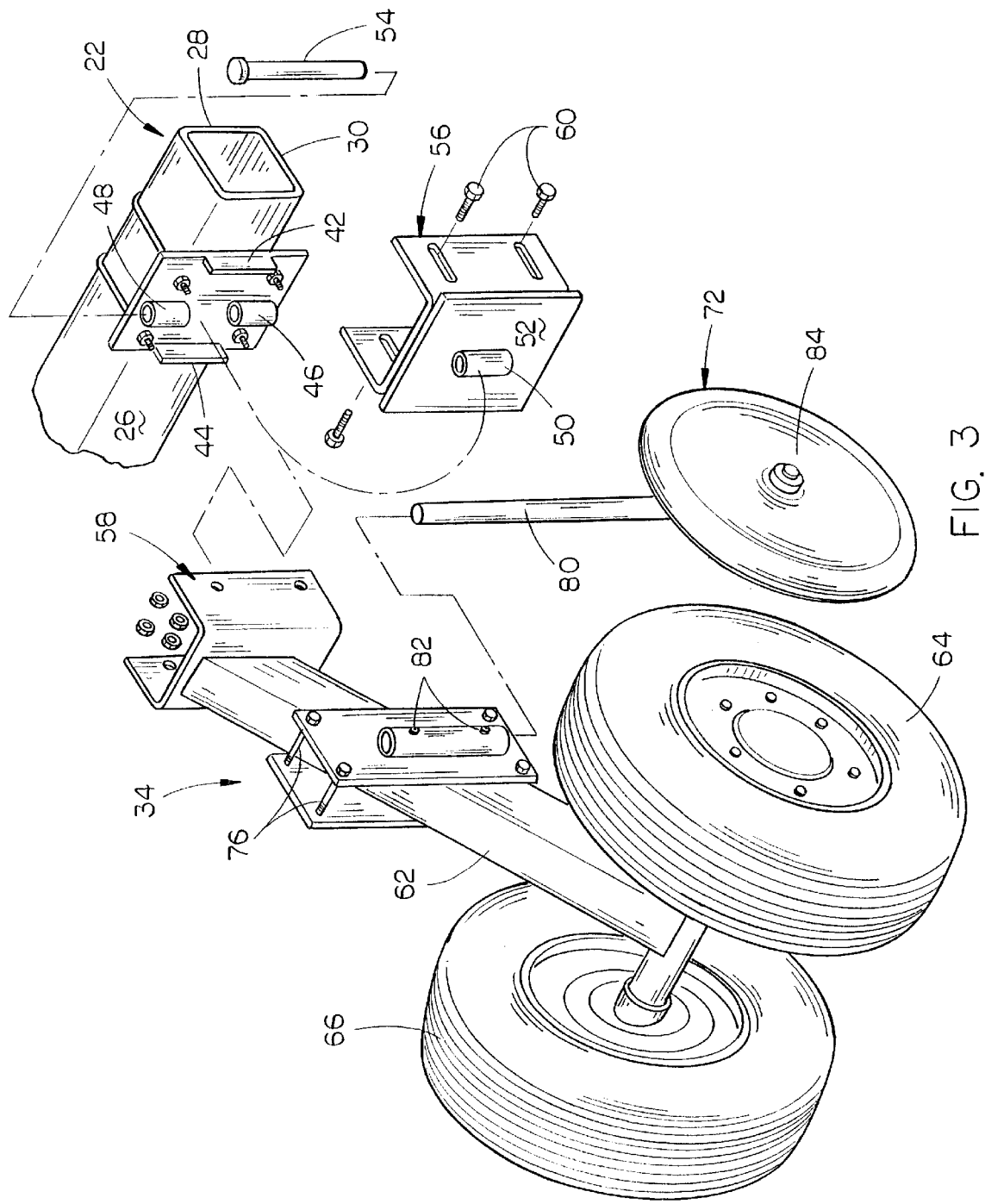
FIG. 3 is an exploded perspective view of the guidance system of this invention.

A ground engaging coulter means 72 is selectively vertically mounted on arm 62, as will now be described. Support plate 74 is secured to arm 56 by bolts 76. Sleeve or collar 78 is welded to the outer surface of support plate 74 and has shaft 80 selectively vertically adjustably secured therein by means of set screws 82 (FIG. 2). Coulter or disc 84 is rotatably mounted at the lower end of shaft 80 and is adapted to engage the ground, as best seen in FIG. 5.

Figure 4:
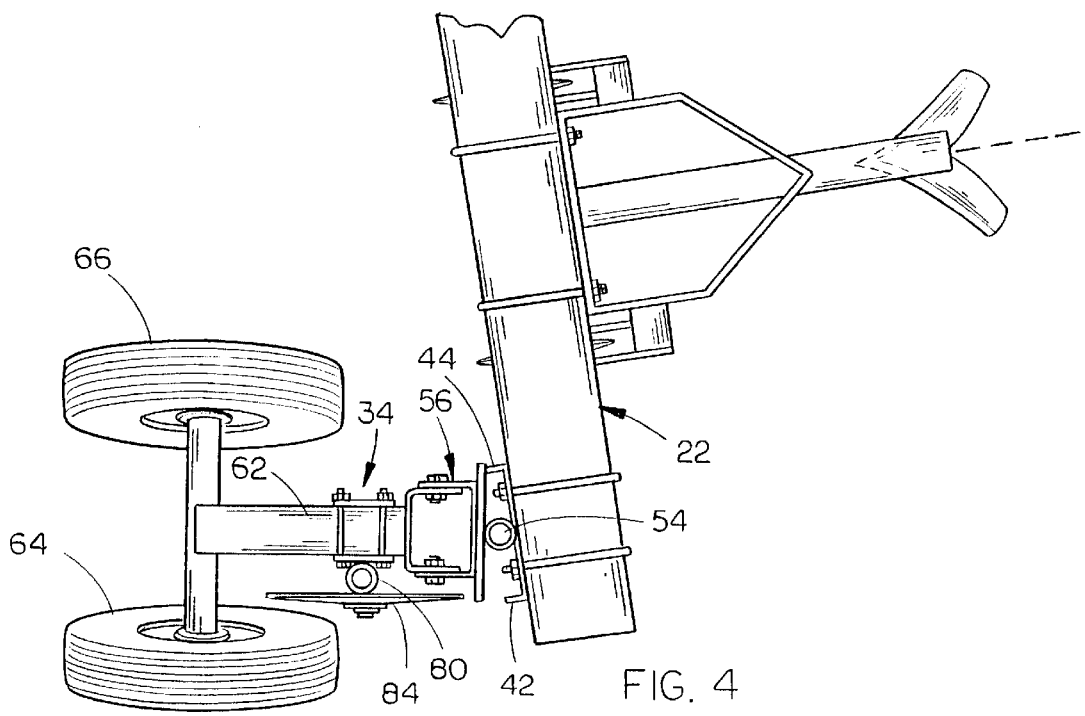
FIG. 4 is a top view of the guidance system of this invention.

In operation, the tractor operator manipulates the implement so that the wheels 64 and 66 either are positioned in a furrow or so to straddle a ridge in the field, which results in the tools on the tool bar being properly positioned with respect to the rows or ridges of the field. As the implement is pulled through the field, the wheels 64 and 66 follow the row or ridge. If the tractor operator should inadvertently move the tractor laterally with respect to the rows or ridges, the tool bar 22 (FIG. 4) will be shifted to create relative angular movement between plates 36 and 52. As arm 62 is pivotally moved, coulter 84 moves with arm 56. The engagement of the coulter 84 with the ground provides further ground engagement and resistance to lateral movement and tends to steer the implement back into proper alignment with the rows. The stops 42 and 44 limit the amount of pivotal movement between the tool bar and the plate 48.

Thus it can be seen that the invention accomplishes at least all of its stated objectives.

I claim:

1. A guidance system for an implement drawn by a tractor with the implement being interconnected to the tractor by a hitch means, the implement including a tool bar having a rearward side, a forward side and opposite ends, comprising:

a first support means having rearward and forward ends;

said first support means being pivotally secured, at its said rearward end, about a vertical axis, to said tool bar inwardly of one end thereof and extending forwardly therefrom;

a ground engaging means rotatably mounted to said forward end of said first support means for following a ridge or a row;

and a ground engaging rotatable coulter means mounted on and supported by said support means rearwardly of said ground engaging means and forwardly of the pivotal connection of said first support means and said tool bar.

2. The system of claim 1 wherein said coulter means is laterally offset with respect to the vertical pivotal axis between said first support means and said tool bar.

3. The system of claim 1 wherein said coulter means is selectively vertically adjustably mounted on said first support means.

4. The system of claim 1 wherein a stop means is provided which limits the amount of pivotal movement between said first support means and said tool bar.

5. The system of claim 1 wherein said ground engaging means comprises a pair of spaced-apart wheels.

6. The system of claim 2 wherein said ground engaging means comprises a pair of spaced-apart wheels and wherein said coulter means is positioned between said wheels.

7. A guidance system for an implement drawn by a tractor with the implement being interconnected to the tractor by a hitch means, the implement including a tool bar having a rearward side, a forward side and opposite ends, comprising:

a support means operatively pivotally connected, about a vertical axis, to said tool bar and positioned forwardly thereof;

a ground engaging wheel means rotatably mounted on said support means forwardly of the vertical pivotal axis connection of said support means with said tool bar;

and a ground engaging rotatable coulter means mounted on and supported by said support means.

8. The system of claim 7 wherein said coulter means is laterally offset with respect to the vertical pivotal axis between said support means and said tool bar.

9. The system of claim 7 wherein a stop means is provided which limits the amount of pivotal movement between said support means and said tool bar.

* * * * *